United States Patent [19]

Simmons et al.

[11] Patent Number: 5,232,472
[45] Date of Patent: Aug. 3, 1993

[54] POLYIMIDE AND POLYAMIDE-IMIDE GAS SEPARATION MEMBRANES

[75] Inventors: John W. Simmons; Okan M. Ekiner, both of Wilmington, Del.

[73] Assignees: E. I. Du Pont de Nemours and Company, Wilmington, Del.; L'Air Liquide S.A., Paris, France

[21] Appl. No.: 970,778

[22] Filed: Nov. 3, 1992

[51] Int. Cl.⁵ .............................................. B01D 13/04
[52] U.S. Cl. .......................................... 55/16; 55/158; 210/500.23; 528/353; 528/183; 528/188; 528/350; 528/26
[58] Field of Search .............. 55/16, 158; 210/500.23; 528/26, 183, 188, 350, 353

[56] References Cited

U.S. PATENT DOCUMENTS

| | | | |
|---|---|---|---|
| 3,533,997 | 10/1970 | Angelo | 260/47 |
| 4,080,744 | 3/1978 | Manos | 34/9 |
| 4,120,098 | 10/1978 | Manos | 34/9 |
| 4,230,463 | 10/1980 | Henis et al. | 55/16 |
| 4,734,464 | 3/1988 | Biensan | 525/420 |
| 4,859,384 | 8/1989 | Fibiger et al. | 264/45.1 |

*Primary Examiner*—Morton Foelak
*Attorney, Agent, or Firm*—Cary A. Levitt

[57] ABSTRACT

Novel polyimide and polyamide-imide gas separation membranes and the process of using such membranes to separate one or more gases from a gaseous mixture is disclosed. The polyimides and polyamide-imides are formed from a blend of diamines containing the ester derived from 1,3-diamino-2-hydroxypropane.

6 Claims, No Drawings

POLYIMIDE AND POLYAMIDE-IMIDE GAS SEPARATION MEMBRANES

FIELD OF THE INVENTION

The present invention relates to polyimide and polyamide-imide gas separation membranes and the process for separating one or more gases from a gaseous mixture using such membranes. The polyimides and polyamide-imides are derived from an esterified polymer which is made from a blend of diamines containing 1–75% of the ester derived from 1,3-diamino-2-hydroxypropane. The inventive gas separation membranes exhibit exceptionally good permeation rates with good selectivity.

BACKGROUND OF THE INVENTION

The present invention relates to improving the performance of aromatic polyimide and polyamide-imide membranes used for the separation of mixtures of gases. Aromatic polyimide and polyamide-imide gas separation membranes are known in the art. Such membranes generally fall within one of two categories. One such category incorporates membranes with high relative selectivities for one gas over another gas permeating through the membrane. Such membranes, however, suffer from having low gas permeation rates. Another category of polyimide gas separation membranes have much higher gas permeation rates, but suffer from correspondingly lower relative gas selectivities. Polyimide gas separation membranes made from aliphatic diamines have not been useful due to poor gas permeation properties and difficulties in polymer synthesis.

It is desirable to have polyimide gas separation membranes which exhibit high gas permeation rates while maintaining high relative gas selectivities. Further, it is desirable for such materials to be easily fabricated into appropriate membrane structures while maintaining excellent end use environmental resistance.

Prior art references to polyimide and polyamide-imide gas separation membranes are abundant. For example, U.S. Pat. No. 3,533,997 discloses aromatic polyimides which incorporate a pendant carboxylic acid function and the crosslinking of such materials through interaction of the pendant carboxylic acid functions and di- to tetra-amine radicals. The polyimides of the present invention do not contain such pendant carboxylic acid functions.

U.S. Pat. No. 4,734,464 discloses a solvent resistant composition comprising a siloxane-containing polyimide and an aromatic compound containing at least two reactive groups such as amino groups which are heated to at least 150° C. The present invention does not incorporate siloxane-containing polyimides or the high temperature treatment.

The prior art does not described or teach a polyimide or polyamide-imide gas separation membrane derived from an esterified polymer which is made from a blend of amines comprising 1–75% of the ester derived from 1,3-diamino-2-hydroxypropane ("DAHP").

SUMMARY OF THE INVENTION

The present invention relates to certain polyimide and polyamide-imide separation membranes particularly useful for separating gases and the process for using them. This class of membrane materials compositionally comprise a blend of diamines containing 1–75% DAHP. Membranes formed from this class of materials exhibit superior gas permeability and good selectivity.

It is believed that the high permeabilities of some gases from multicomponent mixtures is due to the molecular free volume created by the substituted DAHP constituent.

DETAILED DESCRIPTION OF THE INVENTION

The present invention relates to the discovery that gas separation membranes exhibiting exceptional gas permeability can be obtained by forming such gas separation membranes from polyimides and polyamide-imides which are derived from a blend of diamines containing about 1–75%, preferably 10–50%, DAHP. DAHP has the following structural formula:

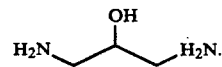

The ester derived from DAHP has the following structural formula:

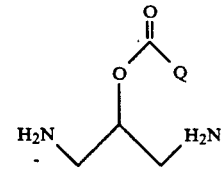

where Q is an alkyl group having 1–10 carbon atoms or an aromatic group having 6 to 12 carbon atoms.

DAHP is mixed with other aromatic diamines, such as aromatic diamines having the general structural formula $H_2N$-Ar-$NH_2$ where Ar is, for example

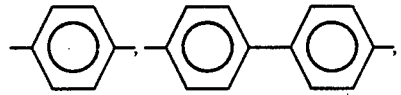

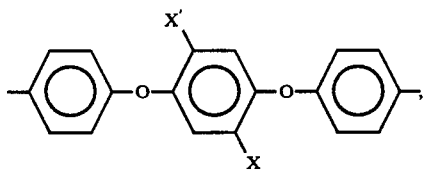

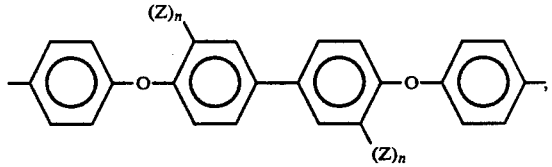

or mixtures thereof, where X is an alkyl group having 1 to 6 carbon atoms or a phenyl group, X' is X or —H and X" is —O—, —S—,

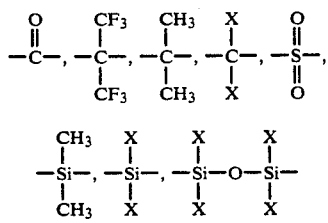

or mixtures thereof and where Z is independently —H, alkyl groups having 1 to 6 carbon atoms, aromatic groups having 6 to 12 carbon atoms, or halogen groups such as —F, Cl, —Br, or —I, where n is an integer from 0 to 4. Each —X and —Z may be different. These examples of Ar are not limiting; Ar may also be other aromatic constituents which are known in the art.

DAHP comprises 1-75%, preferably 10-50% of the total diamine constituent and the aromatic diamine comprises 25-99%, preferably 50-90% of the total diamine constituent.

Preferably, the polyimide is highly soluble so as to facilitate formation of the polymer into a gas separation membrane. In addition, the diamines are preferably highly miscible.

Gas separation membranes prepared from such diamines possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said diamines in the polyimide or polyamide-imide chain.

Generally, an inverse relationship between the gas permeation rate (flux) and the selectivity of said gas over other gases in a multicomponent gas mixture has been exhibited within polymer classes, such as polyimides and polyamide-imides. Because of this, prior art polyimide and polyamide-imide gas separation membranes tend to exhibit either high gas permeation rates at the sacrifice of high gas selectivities or high gas selectivities at the sacrifice of high permeation rates. It would be highly desirable for gas separation membranes to exhibit high gas permeation rates while maintaining high gas selectivities.

The present invention circumvents the above shortcomings and provides exceptionally high permeation polyimide and polyamide-imide gas separation membranes while maintaining good selectivity. It is believed that polyimide gas separation membranes derived from a blend of diamines containing substituted DAHP increases molecular free volume of the polymer which, in turn, increases permeation rates. For aliphatic diamines, DAHP is unique in this respect due to the functional —OH group which reacts to form the ester constituent, thereby increasing molecular free volume. Normally, incorporation of small chain aliphatic diamines increases selectivity of the membrane and decreases the permeation rate of the membrane by allowing better packing of the polymer chains than in polyimides made from aromatic diamines. It is believed that increased packing density is caused by mobility of the aliphatic chain. As such, aliphatic diamines have not previously been incorporated into the aromatic polyimides. Surprisingly, the present invention advantageously provides a membrane with increased permeation while maintaining good selectivity.

Polyimide materials useful in the present invention contain the repeating unit:

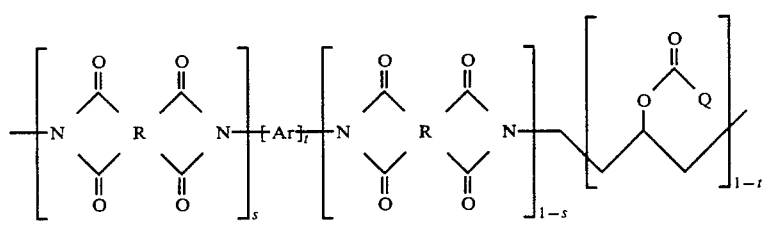

where R is independently

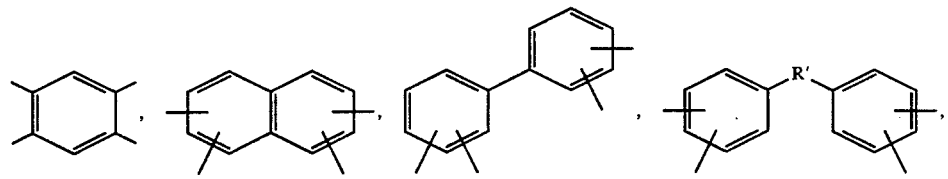

or mixtures thereof;

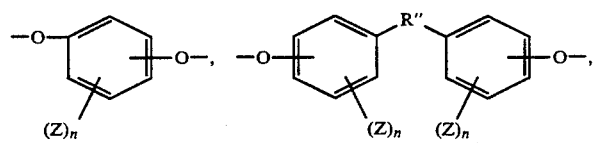

—R'—, is

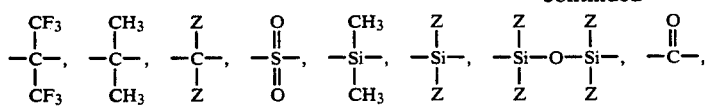

or mixtures thereof, where Z is independently —H, alkyl groups having 1 to 6 carbon atoms, aromatic groups having 6 to 12 carbon atoms, or halogen groups such as —F, Cl, —Br, or —I, where n is an integer from 0 to 4. R" is

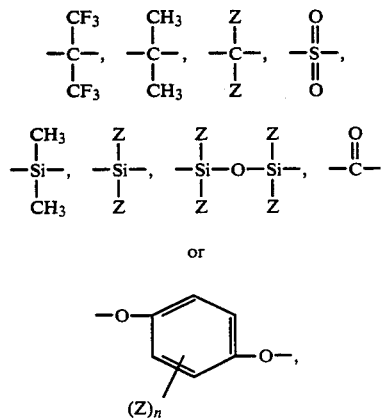

, or mixtures thereof. Ar is any aromatic diamine residue, including without limitation,

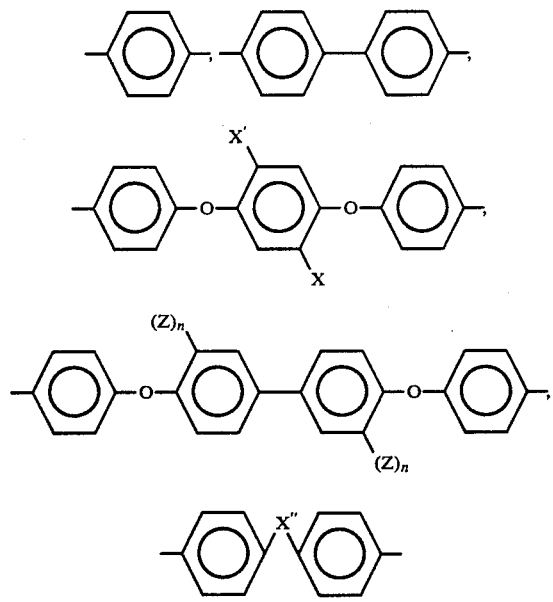

or mixtures thereof, where X is independently an alkyl group having 1 to 6 carbon atoms or a phenyl group, X' is X or —H, and X" is —O—, —S—,

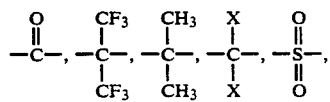

or mixtures thereof. Q is part of the anhydride residue used in the chemical imidization of the polymer, such as, a methyl group or a propyl group. Q may be any alkyl group having 1 to 10 carbon atoms or an aromatic group having 6 to 12 carbon atoms. t is a fraction which is greater than 0.01 and less than about 0.75 and s is a fraction from 0 to 1.0. Q is preferably a methyl group.

In general, the polyimides of this invention have a weight average molecular weight within the preferred range of from about 10,000 up to about 500,000 and more preferably from about 50,000 up to about 150,000.

The polyimides are made by methods well known in the art. In the preferred process for preparing the polyimides of this invention, approximately equimolar quantities of a dianhydride and the diamine mixture are reacted by well-established procedures known in the art. In general, this process involves the polycondensation of the diamines and the dianhydride followed by the dehydration of the resulting polyamic acid to form a polyimide. Thermal imidization to form the polyimide is not preferred because it results in excessive cross-linking of the polymer, causing the polyimide polymer to be intractable and unprocessable.

Preferably, the diamines are first dissolved in a polymerization solvent medium and the dianhydride is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

The solvents which may be used in the polymerization process are organic solvents, preferably anhydrous, whose functional groups do not react with either the dianhydride or diamine reactant to any appreciable extent, and in which either the dianhydride or diamine, preferably both, are soluble. Examples of suitable solvents are N,N-dimethylformamide; N,N-dimethylacetamide; N-methyl-pyrrolidone; gamma-butyrolactone; pyridine; diglyme; and like materials as well as mixtures of such solvents.

Polymerization is conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by combining the polyamic acid solution and a dehydrating agent, such as acetic anhydride, butyric anhydride or benzoic anhydride, preferably acetic anhydride, with or without catalyst, and optionally heating the resulting mixture until imidization is complete. The polyimide may then be recovered from solution by precipitation with alcohol (e.g., methanol) or water and washed with additional alcohol or water.

The resulting polyimides may then, if desired, be blended using conventional solution blending technology to yield a blend having specifically tailored properties.

Polyamide-imide materials useful in the present invention contain the repeating unit:

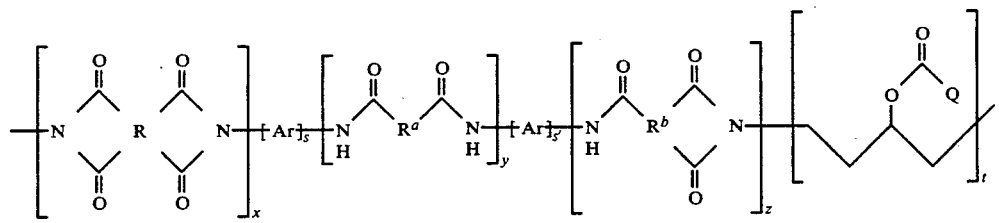

in which R, Ar, Q and t are as defined above. $R^a$ is any aromatic diacid moiety such as

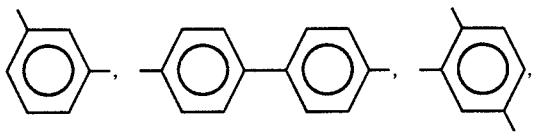

$R^b$ is an aromatic triacid moiety such as 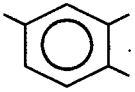

s, s', x, y and t are fractions and $x+y+z=1.0$ and $s+s'+t=1.0$. It is preferable that $y+\frac{1}{2} z$ is less than t in order to minimize crosslinking of the polymer.

The polyamide-imides may be prepared by methods well known in the art, provided that the aromatic diamine should first be reacted with the acid chloride; thereafter DAHP is added to the reaction mixture. This procedure minimizes crosslinking of the polymer. The preferred process is described in the "General Polyamide-imide Procedure" section of the Examples.

The preferred polyimide and polyamide-imide compositions of the present invention are soluble in a wide range of ordinary organic solvents. This is a great advantage for the ease of fabrication of industrially useful gas separation membranes. To prepare membranes in accordance with this invention, the polymer solution is cast as a sheet onto a support, or extruded through a conventional hollow fiber spinneret to yield an asymmetric hollow fiber or coextruded with a suitable substrate solution through a composite fiber spinneret to yield a composite hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present. Insoluble polyimide compositions may be formed into gas separation membranes from their corresponding polyamic acid precursors followed by conversion to the polyimide.

Gas separation membranes prepared from the polyimide and polyamide-imide materials of the present invention possess an excellent balance of gas permeation rates and selectivities for one gas over other gases in a multicomponent gas mixture. Generally, prior polyimide and polyamide-imide gas separation materials exhibit an inverse relationship between the gas permeation rate and the selectivity of said gas over other gases in a multicomponent gas mixture. The preferred materials of the present invention (Example 17) have been found to have a permeation rate for oxygen of 7.26 Barrer while maintaining a good oxygen/nitrogen selectivity.

The polyimides and polyamide-imides described in this invention also have high inherent thermal stabilities. They are generally stable up to 400° C. in air or inert atmospheres. The glass transition temperatures of these polyimides and polyamide-imides are generally above 200° C. The high temperature characteristics of these compositions can help to prevent the membrane compaction problems observed in other polymers at even moderate temperatures.

The polyimide and polyamide-imide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability, P, of gasses through isotropic dense-film membranes is generally defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein
cm$^3$/sec (STP) is the flux (flow rate) in units volume per seconds of permeated gas at standard temperature and pressure,
cm. is the thickness of the film,
cm$^2$ is the area of film, and
cm. Hg is the pressure (or driving force).

The selectivity of a membrane in separating a two component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, a $O_2/N_2 = 10$ indicates that the subject membrane allows oxygen gas to pass through at a rate 10 times that of nitrogen.

The flux of gasses through an asymmetric membrane can be defined in terms of gas permeation units, GPUs, as $$GPU = \frac{10^{-6} \text{ cm}^3 \text{ (STP)}}{\text{cm}^2 \times \text{sec.} \times \text{cm Hg}}$$

wherein the units are described above.

General Process for Making DAHP Containing Polyimides

The diamines (1,3-diamine-2-hydroxypropane (DAHP) and the aromatic diamine) are dissolved in a polar solvent (preferably N-methylpyrrolidone (NMP) or N,N'-dimethylacetamide (DMAC) in a reaction vessel equipped with a mechanical stirrer and nitrogen inlet. The dianhydride(s) are added portionwise to the reaction vessel which is rapidly stirred. The ratio of diamines to dianhydrides is preferably 1:1 to ensure the highest molecular weight. More NMP is added to the reaction vessel to achieve total solids concentration of about 15-20%. The reaction mixture is allowed to stir at room temperature overnight under a nitrogen atmosphere. The resulting polyamic acid is chemically converted to polyimide using an anhydride (preferably acetic anhydride, but propionic, butyric, valeric and benzoic anhydrides have also been used) and triethylamine. During the imidization step, the anhydride will react with the free hydroxyl group of the DAHP converting it into an ester. A 20-50% molar excess of anhydride and triethylamine is normally used to ensure total conversion to the ester and imide. The reaction mixture is heated to around 100°-120° C. for 1-2 hours to complete the imidization. The polyimide is precitated into water and collected by filtration, washed twice with water and then methanol. The polymer is air-dried overnight, and subsequently dried in a vacuum oven at 250° C. for 3 hours.

Thermal conversion of the polyamic acid to polyimide should generally be avoided because this can lead to an insoluble polyimide, which is generally undesirable in membrane applications.

General Polyamide-imide Procedure

The aromatic diamine (not DAHP) is dissolved in a polar solvent (preferably NMP or DMAC) in a reaction vessel equipped with a mechanical stirrer and nitrogen inlet. Then, a tertiary amine (such as pyridine or triethylamine) is added. The amount of tertiary amine varies depending upon the amount of acid chloride used in next step, but there should always be an excess in order to neutralize the HCl generated during amidization. The reaction mixture is cooled in an ice-bath and the acid chloride (dissolved in NMP) is added. For larger reactions, the acid chloride should be added dropwise, maintaining the reaction temperature below 25° C. Following the addition of the acid chloride, the ice-bath is removed and the reaction is allowed to warm to room temperature. The mixture is stirred for 40-60 minutes at room temperature. The DAHP is then added and the reaction mixture is stirred for an additional 15 minutes. After this time, the dianhydride is added and the reaction mixture is stirred at room temperature overnight. The overall ratio of diamines to acid chloride and dianhydride is preferably 1:1 to ensure the highest possible molecular weight. The total solids concentration should be kept between 15-20%.

The polyamide-amic acid is chemically converted to polyamide-imide using an anhydride (preferably acetic anhydride, but propionic, butyric, valeric and benzoic anhydrides have also been used) and triethylamine. During imidization, the anhydride will react with the free hydroxyl group of the DAHP converting it into an ester. A 20-50% molar excess of anhydride and triethylamine is normally used to ensure total conversion to the ester and imide. The reaction mixture is heated to around 100°-120° C. for 1-2 hours to complete the imidization. The polyamide-imide is precitated into water and collected by filtration, washed twice with water and then with methanol. The polymer is air-dried overnight, and subsequently dried in a vacuum oven at 250° C. for 3 hours.

Thermal conversion of the polyamide-amic acid to polyamide-imide should generally be avoided because this can lead to an insoluble polyamide-imide, which is generally undesirable in membrane applications.

The invention will now be further illustrated by way of the following Examples, which are considered to be illustrative only, and non-limiting.

EXAMPLE

Examples 1-24

A 2-liter 3-necked round-bottom flask, equipped with a mechanical stirrer and a nitrogen inlet, was charged with 1,3-diamino-2-hydroxypropane (DAHP) (Diamine 1 in Table 1) (mole % 1×0.25 mol), Diamine 2, identified in Table 1 (mole % 2×0.25 mol) and N-methylpyrrolidone (NMP) (1000 ml). The molar ratio of Diamine 1 to Diamine 2 is reported in Table 1. After the diamines were allowed to dissolve, a mixture of Dianhydride 3 identified in Table 1 (mole % 3×0.25 mol) and Dianhydride 4 identified in Table 1 (mole % 4×0.25 mol) was added portionwise at room temperature over a 10-minute period. The molar ratio of Dianhydride 3 to Dianhydride 4 is reported in Table 1. Another 125 ml of NMP was added to the reaction mixture to rinse down the sides of the reaction vessel. The solution was allowed to stir overnight at room temperature. To this stirred reaction mixture was added consecutively, triethylamine, an anhydride identified in Table 1 and NMP (100 ml). An excess (20-50%) of triethylamine and anhydride were used to ensure the total conversion of the hydroxyl group to the ester as well as total imide conversion. The polymerization mixture was heated to 100° C. for 2 hours. After cooling the reaction mixture to room temperature, the polymer was precipitated into water and ground up in a blender. The polymer was filtered and washed consequently with water and then methanol. The polymer was air-dried overnight at room temperature and then dried in a vacuum oven (2.67 kPa) at 250° C. for 2 hours. (Inherent Viscosity ("I.V.")=0.4 to 1.5, 0.5 wt. % polymer in NMP, dl/g). The polyimides varied in color from light yellow to brown.

The resulting polyimides were usually soluble in N-methylpyrrolidone, N,N'-dimethylacetamide, and dichloromethane but insoluble in acetone.

A film of each of the above polyimides was cast from a 10 to 20% by weight NMP solution onto a glass plate at 120° C. with a 15-mil (38×10⁵ m) knife gap. The film was dried on the plate at 120° C. for 60-90 minutes and then removed from the plate. The film was air-dried overnight. The film was then further dried in a vacuum oven (2.67 kPa) at 230° C. for 18 hours.

The above films (film thicknesses=1-2.5 mils) were tested for oxygen permeability and mixed gas oxygen/nitrogen (21/79 mole ratio) permeabilities at 500 psig ($34.5 \times 10^{-5}$ Pa) at 25° C. The results are reported in Table 1.

then the anhydride. The molar ratio of the dianhydride (Dian 7) to the Acid Chloride (Acid Cl 8) is reported in Table 2. A 50% molar excess of triethylamine and anhydride were used to ensure the total conversion of the hydroxyl group to the ester as well as total imide conversion. The polymerization mixture was then heated to 100° C. for 2 hours. After cooling the reaction mixture to room temperature, the polymer was precipitated into water and broken up in a blender. The polymer was filtered and washed consecutively with water and then

TABLE 1

Properties of DAHP Containing Polymides

| Exam | Diam (1) | Diam (2) | Mole % 1/Mole % 2 | Dian (3) | Dian (4) | Mole % 3/Mole % 4 | Anhydride | $P_{O_2}$ | $P_{O_2}/P_{N_2}$ |
|---|---|---|---|---|---|---|---|---|---|
| 1 | A | B | 25/75 | Z | — | 100/0 | Ac₂O | 3.09 | 6.66 |
| 2 | A | C | 25/75 | Z | — | 100/0 | Ac₂O | 3.56 | 6.24 |
| 3 | A | D | 25/75 | Z | — | 100/0 | Ac₂O | 5.30 | 6.56 |
| 4 | A | D | 25/75 | Z | Y | 75/25 | Ac₂O | 2.39 | 7.08 |
| 5 | A | D | 0/100 | Z | — | 100/0 | Ac₂O | 6.00 | 4.80 |
| 6 | A | E | 25/75 | Z | — | 100/0 | Ac₂O | 2.99 | 6.82 |
| 7 | A | E | 50/50 | Z | — | 100/0 | Ac₂O | 1.68 | 6.90 |
| 8 | A | E | 0/100 | Z | — | 100/0 | Ac₂O | 2.93 | 6.29 |
| 9 | A | F | 25/75 | Z | — | 100/0 | Ac₂O | 1.40 | 6.46 |
| 10 | A | F | 50/50 | Z | — | 100/0 | Ac₂O | 0.94 | 7.81 |
| 11 | A | F | 25/75 | Z | W | 50/50 | Ac₂O | 0.46 | 8.19 |
| 12 | A | F | 0/100 | Z | — | 100/0 | Ac₂O | 1.68 | 6.84 |
| 13 | A | F | 25/75 | Z | — | 100/0 | Pr₂O | 1.55 | 5.60 |
| 14 | A | F | 15/75 | Z | — | 100/0 | Va₂O | 1.22 | 5.25 |
| 15 | A | G | 25/75 | Z | — | 100/0 | Va₂O | 3.79 | 6.47 |
| 16 | A | G | 25/75 | Z | — | 100/0 | Pr₂O | 2.95 | 6.86 |
| 17 | A | G | 0/100 | Z | — | 100/0 | Ac₂O | 7.26 | 5.79 |
| 18 | A | G | 25/75 | Z | — | 100/0 | Ac₂O | 4.33 | 6.75 |
| 19 | A | G | 50/50 | Z | — | 100/0 | Ac₂O | 1.69 | 7.25 |
| 20 | A | G | 75/25 | Z | — | 100/0 | Ac₂O | 1.65 | 7.40 |
| 21 | A | G | 25/75 | Y | — | 100/0 | Ac₂O | 0.65 | 8.28 |
| 22 | A | H | 0/100 | X | — | 100/0 | Ac₂O | 3.07 | 6.78 |
| 23 | A | H | 10/90 | X | — | 100/0 | Ac₂O | 2.57 | 6.99 |
| 24 | A | H | 20/80 | X | — | 100/0 | Ac₂O | 1.81 | 7.20 |

Examples 25-33

A 250 ml 3-necked round-bottom flask, equipped with a mechanical stirrer and a nitrogen inlet, was charged with Diamine 6 identified in Table 2 (mole % 6×0.025 mol), N-methylpyrrolidone (70 ml) and pyridine (2.5×mole % 8×0.025 mol). After Diamine 6 identified in Table 2 was dissolved, the reaction mixture was cooled in an ice-bath, and the Acid Chloride 8 identified in Table 2 (mole % 8×0.025 mol), dissolved in 10 ml of NMP, was added. The reaction mixture was allowed to stir for 20 minutes and then the ice-bath was removed. Stirring was continued for an additional 40 minutes as the reaction temperature reached room temperature. The DAHP (Diam 5 in Table 2) (mole % 5×0.025 mol) was then added, followed by the addition of the dianhydride (Dian 7 in Table 2) (mole % 7×0.025 mol) and NMP. The total solids concentration was kept between 15-20%. The viscous solution was stirred overnight at room temperature. To this stirred reaction mixture was added consecutively, triethylamine and methanol. The polymer was air-dried overnight at room temperature and then dried in a vacuum oven (2.67 kPa) at 250° C. for 2 hours. (I.V.=0.5-1.5, 0.5 wt. % polymer in NMP, dl/g.) The polyamide-imides were generally light yellow to light brown.

The resulting polyamide-imides were usually soluble in N-methylpyrrolidone, N,N'-dimethylacetamide, and dichloromethane but insoluble in acetone.

A film of each of the above polyamide-imides was cast from a 20% NMP solution onto a glass plate at 120° C. with a 15-mil (38×10⁻⁵ m) knife gap. The film was dried on the plate at 120° C. for 60-90 minutes and then removed from the plate. The film was air-dried overnight. The film was then further dried in a vacuum oven (2.67 kPa) at 230° C. for 18 hours.

The above films (film thicknesses=1-2.5 mils) were tested for oxygen permeability and mixed gas oxygen/nitrogen (21/79 mole ratio) permeabilities at 500 psig. ($34.5 \times 10^{-5}$ Pa) at 25° C. The results are reported in Table 2. The chemical structure of the reactants is identified in the Glossary.

TABLE 2

Properties of DAHP Containing Polyamide-imides

| Exam | Diam (5) | Diam (6) | Mole % 5/Mole % 6 | Dian (7) | Acid Cl (8) | Mole % 7/Mole % 8 | Anhydride | $P_{O_2}$ | $P_{O_2}/P_{N_2}$ |
|---|---|---|---|---|---|---|---|---|---|
| 25 | A | D | 25/75 | Z | V | 80/20 | Ac₂O | 2.96 | 6.99 |
| 26 | A | E | 25/75 | Z | V | 75/25 | Ac₂O | 1.08 | 6.78 |
| 27 | A | E | 20/80 | Z | U | 60/40 | Ac₂O | 1.08 | 6.04 |
| 28 | A | F | 20/80 | Z | U | 60/40 | Ac₂O | 0.59 | 8.09 |
| 29 | A | F | 25/75 | Z | T | 75/25 | Ac₂O | 1.31 | 7.14 |
| 30 | A | G | 20/80 | Z | U | 60/40 | Ac₂O | 2.72 | 6.78 |
| 31 | A | G | 20/80 | Z | V | 50/50 | Ac₂O | 1.31 | 6.75 |
| 32 | A | G | 25/75 | Z | V | 75/25 | Ac₂O | 3.00 | 6.86 |

TABLE 2-continued

| | | | Properties of DAHP Containing Polyamide-imides | | | | | | |
|---|---|---|---|---|---|---|---|---|---|
| Exam | Diam (5) | Diam (6) | Mole % 5/Mole % 6 | Dian (7) | Acid Cl (8) | Mole % 7/Mole % 8 | Anhydride | $P_{O_2}$ | $P_{O_2}/P_{N_2}$ |
| 33 | A | G | 25/75 | Z | V | 75/25 | Pr$_2$O | 2.60 | 6.68 |

Glossary for Examples 1–33
A = 1,3-diamino-2-hydroxypropane; (DAHP)
B = 4,4'-Oxydianiline (ODA); (4-aminophenyl ether)
C = p-Phenylenediamine; (PPD)
D = 1,5-Diaminonaphtalene; (1,5-ND)
E = 1,4-Bis(4-aminophenoxy)benzene; (APB-144)
F = 1,3-Bis(4-aminophenoxy)benzene; (APB-134, RODA)
G = 1,4-Bis(4-aminophenoxy)-2-t-butylbenzene; (2-t-Bu-APB-144)
H = 4,4'-Bis(4-aminophenoxy)-3,3'-di-t-butylbiphenyl; (APDBBP)
Z = 2,2-Bis(3,4-dicarboxyphenyl)hexafluoropropane dianhydride; (6FDA)
Y = 3,3',4,4'-Benzophenonetetracarboxylic acid dianhydride; (BTDA)
X = 5,5'-Sulfonyl-1,3-isobenzofurandione; (DSDA); (diphenylsulfone dianhydride)
W = 5,5'-Oxy-bis-1,3-isobenzofuranidione; (ODPA); (Oxyphthalic dianhydride)
U = 1,2,4-Benzenetricarboxylic anhydride acid chloride; (TMAC)
V = (70/30) mixture of isophthaloyl/terephthaloyl chloride; (I/T)
T = 5-t-Butylisophthaloyl chloride; (BIPC)
Ac$_2$O = Acetic Anhydride
Pr$_2$O = Propionic Anhydride
Va$_2$O = Valeric Anhydride The DAHP containing polyimides and polyamide-imides examined in Examples 34–43 are defined in the Glossary for Examples 34–43. The constituents of those polyimides and polyamide-imides are defined in Table 3.

Glossary for Examples 34–43
Polyimide I-2-t-BuAPB-144/DAHP(3:1) 6FDA
Polyimide J-ODA/DAHP(3:1)/6FDA
Polyamide/imide K-2-t-BuAPB-144/DAHP(4:1)/6-FDA/TMAC(3:2)
Polyimide L-1,5ND/DAHP(3:1)/6FDA/BTDA(3:1)
Polyamide/imide M-2-t-BuAPB-144/DAHP(3:1)/6-FDA/I/T(3:1)

TABLE 3

CHEMICAL STRUCTURES OF POLYMER COMPONENTS

CHEMICAL NAME: 2-tertiary butyl-1,4-Bis(4-aminophenoxy)benzene
TRADE NAME: 2-t-Bu-APB-144
CHEMICAL STRUCTURE:

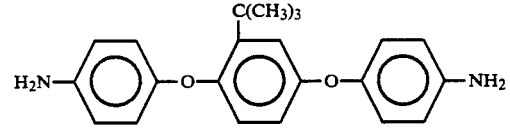

CHEMICAL NAME: 1,3-diamino-2-hydroxy propane
TRADE NAME: DAHP
CHEMICAL STRUCTURE:

CHEMICAL NAME: 2,2-Bis (3,4-dicarboxyphenyl) hexafluoropropane dianhydride
TRADE NAME: 6FDA
CHEMICAL STRUCTURE:

CHEMICAL NAME: 4,4'-Oxydianiline
TRADE NAME: ODA
CHEMICAL STRUCTURE:

CHEMICAL NAME: 1,2,4-Benzenetricarboxylic anhydride acid chloride
TRADE NAME: TMAC

TABLE 3-continued
CHEMICAL STRUCTURES OF POLYMER COMPONENTS

CHEMICAL STRUCTURE

[Structure: 4-chlorocarbonylphthalic anhydride]

| | |
|---|---|
| CHEMICAL NAME | 1,5-Diaminonaphthalne |
| TRADE NAME | 1,5ND |

CHEMICAL STRUCTURE

[Structure: 1,5-diaminonaphthalene]

| | |
|---|---|
| CHEMICAL NAME | 3,3',4,4'-Benzophenone tetracarboxylic acid dianhydride |
| TRADE NAME | BTDA |

CHEMICAL STRUCTURE

[Structure: BTDA]

| | |
|---|---|
| CHEMICAL NAME | Diaminophenylindane |
| TRADE NAME | DAPI |

CHEMICAL STRUCTURE

[Structure: DAPI]

| | |
|---|---|
| CHEMICAL NAME | isophthaloyl/terephthaloyl chloride (70:30 mole ratio) |
| TRADE NAME | I/T |

CHEMICAL STRUCTURE

[Structure: terephthaloyl chloride]

Example 34

A polymer solution containing 27% by weight Polyimide I and 25% weight based on polymer tetramethylenesulfone in N-methylpyrrolidone was extruded through a hollow fiber spinneret with fiber channel dimensions of outer diameter equal to 559 microns ($5.59 \times 10^{-4}$ m) and inner diameter equal to 254 microns ($2.54 \times 10^{-4}$ m) at a rate of 140 cm$^3$/hr at 95° C. A solution containing 70% by volume N-methylpyrrolidone in water was injected into the fiber bore at a rate of 45 cm$^3$/hr to generate the hollow fiber configuration. The spun fiber passed through an air-gap length of 10 cm at room temperature into a water coagulant bath at 6° C. and was wound-up at a rate of 100 m/min.

The water-wet fiber was washed with running water at 50° C. for about 12 hours and dehydrated as taught in U.S. Pat. No. 4,080,744 and U.S. Pat. No. 4,120,098. This specifically involved the replacement of water with methanol followed by the replacement of methanol with normal hexane and drying in a vacuum oven (2.67 kPa).

The asymmetric hollow fibers, prepared as described above were tested for mixed gas $O_2/N_2$ (21/79 mole) permeabilities while applying 100 psig (689 KPa) on the shell side of the fibers at room temperature. Results are reported below:

$O_2$ Productivity = 185 GPU

-continued $O_2/N_2$ Selectivity = 1.2

The fibers were treated to seal defects protruding throught the dense outer gas separating layer as taught in U.S. Pat. No. 4,230,463. This specifically involved contacting the outer surface of the fibers with a hexane solution containing 1% weight SYLGARD 184 for a period of 30 min. at room temperature and at a vacuum (2.67 kPa) in the fiber bore. The hexane was dried and the hollow fibers were allowed to air-dry. The above-treated fibers were tested for mixed gas $O_2/N_2$ (21/79 mole) at 100 psig and 21° C. Results are reported below:

$O_2$ Productivity = 21 GPU
$O_2/N_2$ Selectivity = 5.2

Example 35

Hollow fibers were spun as described in Example 34 except the spin dope solution extrusion rate was increased to 180 cm$^3$/hr, the bore fluid injection rate was increased to 52.5 cm$^3$/hr and the fiber was wound up at 118 m/min while the spinneret temperature was maintained at 105° C.

The fibers were tested for mixed gas $O_2/N_2$ (21/79) while applying 100 psig (689 KPa) on the shell side of the fibers before and after treatment with 1% SYLGARD solution in hexane as described in Example 34. The results are reported below:

Before treatment to seal defects
$O_2$ Productivity = 178 GPU
$O_2/N$ Selectivity = 1.2
After treatment to seal defects
$O_2$ Productivity = 27 GPU
$O_2/N_2$ Selectivity = 4.5

Example 36

A solution containing 27% weight Polyimide J and 30% weight based on polymer tetramethylenesulfone in N-methylpyrrolidone was extruded through a spinneret having the same fiber channel dimensions as described in Example 34 at a rate of 140 cm$^3$/hr at 90° C. A solution of 75% by volume N-methylpyrrolidone in water was injected into the bore of the fiber at a rate of 52.5 cm$^3$/hr. The nascent fiber traveled through an air-gap length of 2.5 cm at ambient temperature into a water coagulant bath maintained at 13° C. The fibers were wound-up at a rate of 100 m/min.

The spun fibers were washed. dehydrated and tested for mixed gas $O_2/N_2$ permeabilities while applying 100 psig on the shell side before and after treatment with 1% weight SYLGARD solution in hexane as described in Example 34. The results are reported below:

Before treatment to seal defects
$O_2$ Productivity = 511 GPU
$O_2/N_2$ Selectivity = 1
After treatment to seal defects
$O_2$ Productivity = 35 GPU
$O_2/N_2$ Selectivity = 2.7

Example 37

Hollow fibers were spun as described in Example 36 except the dope solution feed rate was increased to 150 cm$^3$/hr, and the air-gap length was increased to 5 cm while the spinneret was maintained at 100° C.

The fibers were washed, dehydrated and tested for mixed gas $O_2/N_2$ while applying 100 psig on the shell side of fibers before and after treatment with 1% weight SYLGARD solution in hexane as described in Example 34. Results are reported below.

Before treatment to seal defects
$O_2$ Productivity = 279 GPU
$O_2/N_2$ Selectivity = 1.0
After treatment to seal defects
$O_2$ Productivity = 19 GPU
$O_2/N_2$ Selectivity = 4.8

Example 38

A spin dope formulation containing 27% weight Polyamide-imide K and based on polymer 15% weight LiNO$_3$ and 20% weight tetramethylenesulfone in N-methylpyrollidone was extruded at a rate of 200 cm$^3$/hr through a spinneret having the same fiber channel dimensions as described in Example 34 at 90° C. A solution containing 65% by volume N-methylpyrrolidone in water was injected to the fiber bore at a rate of 52.5 cm$^3$/hr. The nascent fiber traveled through an air-gap length of 10 cm at room temperature into a water coagulant bath at 22° C. and was wound-up at a rate of 100 m/min. The fibers were washed, dehydrated and tested for mixed gas $O_2/N_2$ while applying 100 psig on the shell side of fibers before and after treatment with 1% weight SYLGARD solution in hexane as described in Example 34. Results are reported below:

Before treatment to seal defects
$O_2$ Productivity = 429 GPU
$O_2/N_2$ Selectivity = 1
After treatment to seal defects
$O_2$ Productivity = 33 GPU
$O_2/N_2$ Selectivity = 3.4

Example 39

This example describes the material and processes by which composite blend polyamide/imide hollow fiber gas separation membranes were produced.

As taught in U.S. Pat. No. 5,085,676, a substrate solution containing 26% total weight of a polymer blend comprising 90:10 by weight of ULTEM 1000 (commercially available polyimide from General Electric Co.) and MATRIMID 5218 (commercially available polyimide from Ciba Geigy Corp.) and (based on total polymer) 7.5% weight LiNO$_3$, 30% weight tetramethylenesulfone and 6% weight acetic anhydride in N-methylpyrrolidone was extruded at a rate of 107 cm$^3$/hr through a composite fiber spinneret having the same fiber channel dimensions as described in Example 34 at 90° C. A separating polymer solution containing 27% total weight 90:10 weight Polyamide-imide K/MATRIMID 5218 blend polymer and (based on total polymer) 30% weight tetramethylenesulfone in N-methylpyrrolidone was coextruded onto the substrate solution at a rate of 12 cm$^3$/hr. A solution containing 75% by volume N-methylpyrrolidone in water was injected into the bore of the composite fiber at a rate of 52.5 cm³/hr. The nascent fiber travelled through an air-gap length of 10 cm at room temperature into a water coagulant bath maintained at 24° C. and was wound-up at a rate of 80 m/min.

The fibers were washed, dehydrated and tested for mixed gas ($O_2/N_2$) permeabilities while applying 100 psig on the shell side of the fibers before and after treatment with 1% weight SYLGARD solution in hexane as described in Example 34. Results are reported below:

| Before treatment to seal defects |
|---|
| $O_2$ Productivity = 127 GPU |
| $O_2/N_2$ Selectivity = 1 |
| After treatment to seal defects |
| $O_2$ Productivity = 18 GPU |
| $O_2/N_2$ Selectivity = 4.5 |

Example 40

Composite fibers were spun as described in Example 39 except the substrate solution coextrusion rate was increased to 267 cm³/hr, the separating polymer solution coextrusion rate was increased to 32 cm³/hr at the composite spinneret temperature of 95° C. and the fiber was coagulated in a water coagulant bath at 8° C. while being wound-up at a rate of 170 m/min.

The fibers were washed, dehydrated and tested for mixed gas ($O_2/N_2$) permeabilities while applying 100 psig on the shell side of the fibers before and after treatment with 1% weight SLYGARD solution in hexane as described in Example 34. The results are reported below:

| Before treatment to seal defects |
|---|
| $O_2$ Productivity = 96 GPU |
| $O_2/N_2$ Selectivity = 1.1 |
| After treatment to seal defects |
| $O_2$ Productivity = 22 GPU |
| $O_2/N_2$ Selectivity = 4.7 |

Example 41

A spin dope formulation containing 28% weight Polyimide L and based on polymer 30% weight tetramethylenesulfone and 6% weight acetic anhydride in N-methylpyrrolidone was extruded through a spinneret having the same fiber channel dimensions as described in Example 34 at a rate of 160 cm³/hr at 70° C. A solution containing 70% N-methylpyrrolidone in water was injected into the bore of the fiber at the rate of 52.5 cm³/hr. The nascent fiber traveled through an air-gap length of 10 cm at room temperature into a water coagulant bath maintained at 22° C. and was wound-up at a rate of 100 m/min.

The spun fibers were washed, dehydrated and tested for mixed gas $O_2/N_2$ permeabilities while applying 100 psig on the shell side as described in Example 34. The results are reported below:

| $O_2$ Productivity = 52 GPU |
|---|
| $O_2/N_2$ Selectivity = 2.7 |

The fibers were treated by contacting the outer surfaces with pure FREON-113 for a period of 30 minutes at room temperature and at a vacuum (2.67 kPa) in the fiber bore. The FREON-113 was drained and the fibers were allowed to air-dry. The above-treated fibers were tested for mixed gas $O_2/N_2$ at 100 psig and 21° C. The results are reported below:

| $O_2$ Productivity = 21 GPU |
|---|
| $O_2/N_2$ Selectivity = 5 |

Example 42

Hollow fibers were spun as described in Example 41 except the spinneret temperature was increased to 90° C. and the air-gap length was reduced to 2.5 cm.

The fibers were washed, dehydrated and tested for mixed gas $O_2/N_2$ while applying 100 psig on the shell side of fibers before and after treatment with pure FREON-113. Results are reported below:

| Before treatment to seal defects |
|---|
| $O_2$ Productivity = 44 GPU |
| $O_2/N_2$ Selectivity = 3.8 |
| After treatment to seal defects |
| $O_2$ Productivity = 17 GPU |
| $O_2/N_2$ Selectivity = 6.5 |

Example 43

As taught in U.S. Pat. No. 5,085,676, a substrate solution containing 32.5% total weight 90:10 weight ULTEM 1000 and MATRIMID 5218 blend polymer and 30% (based on total polymer) tetramethylenesulfone and 6% (based on total polymer) acetic anhydride in N-methylpyrrolidone was extruded at a rate of 143 cm³/hr through a composite fiber spinneret having the same fiber channel dimensions as described in Example 34 at 85° C. A separating polymer solution containing 27% Polyamide-imide M and 15% (based on polymer) $LiNO_3$ and 20% (based on polymer) tetramethylenesulfone in N-methylpyrrolidone was coextruded onto the substrate solution at a rate of 16 cm³h/hr. A solution containing 90% by volume N-methylpyrrolidone in water was injected into the bore of the composite fiber at a rate of 52.5 cm³/hr. The nascent fiber traveled through an air-gap length of 1 cm at room temperature into a water coagulant bath maintained at 25° C. and was wound-up at a rate of 100 m/min.

The fibers were washed, dehydrated and tested for mixed gas O2/N2 while applying 100 psig on the shell side of the fibers as described in Example 34. The results are reported below:

| $O_2$ Productivity = 15 GPU |
|---|
| $O_2/N_2$ Selectivity = 5.9 |

What is claimed is:

1. A gas separation membrane formed from a polyimide comprising repeating units of the formula:

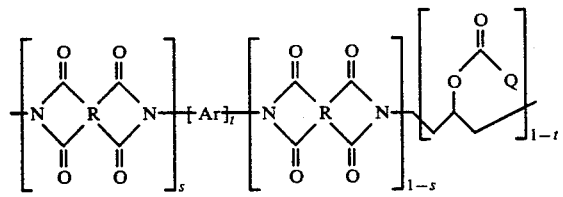

where 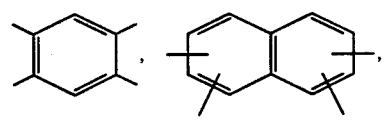 is independently

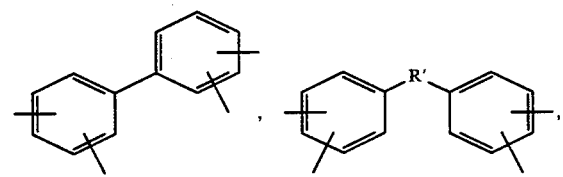

or mixtures thereof;

—R'— is 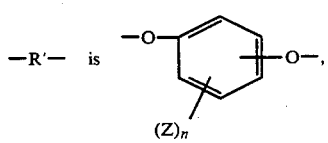

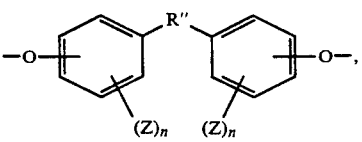

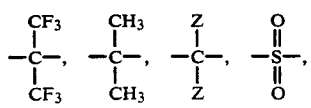

or mixtures thereof, where Z is independently —H, alkyl groups having 1 to 6 carbon atoms, aromatic groups having 6 to 12 carbon atoms, or halogen groups such as —F, Cl, —Br, or —I, where n is an integer from 0 to 4. R" is

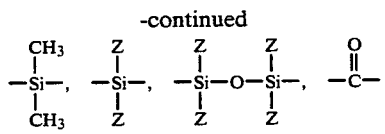

-continued or

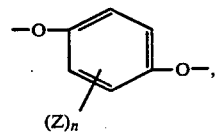

or mixtures thereof; Ar is any aromatic diamine residue; Q is an alkyl group having 1-10 carbon atoms or an aromatic group having 6-12 carbon atoms; t is a fraction from 0.01 to about 0.75 and s is a fraction from 0 to 1.0.

2. The membrane of claim 1 where Q is $CH_3$.

3. The membrane of claim 1 where Ar is selected from the group consisting of

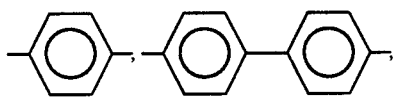

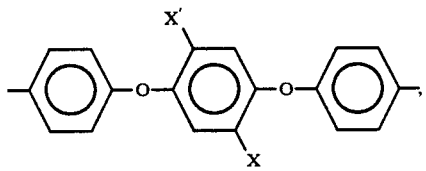

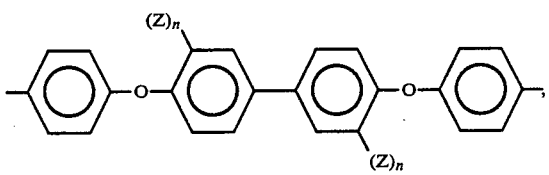

or mixtures thereof, where X is independently an alkyl group having 1 to 6 carbon atoms or a phenyl group, X' is X or —H, and X" is —O—, —S—,

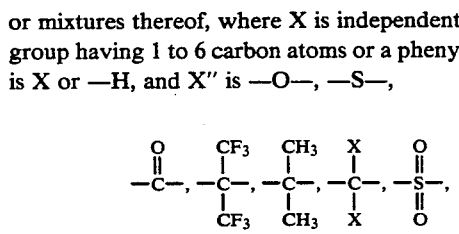

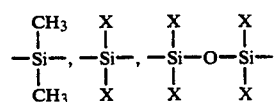

4. A gas separation membrane formed from a polyamide-imide containing repeating units of the formula:

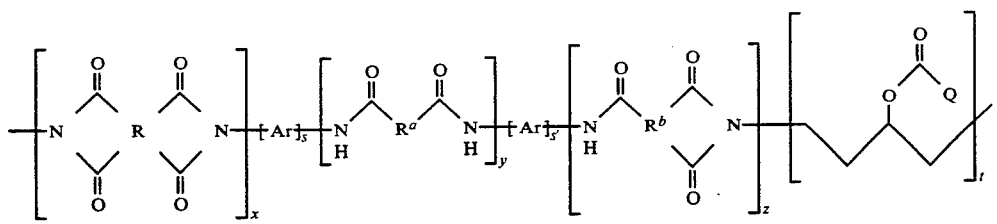

where  is independently

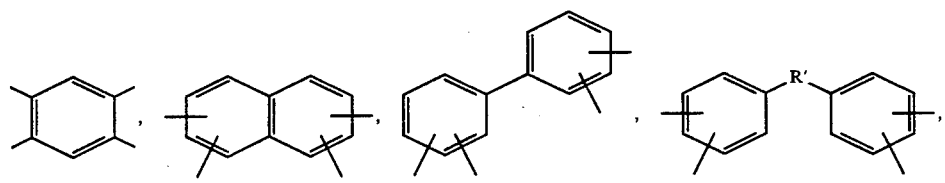

or mixtures thereof;

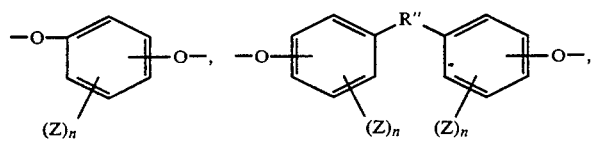

—R'—, is

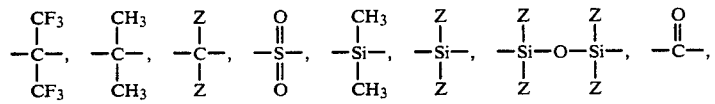

or mixtures thereof, where Z is independently —H, alkyl groups having 1 to 6 carbon atoms, aromatic groups having 6 to 12 carbon atoms, or halogen groups such as —F, Cl, —Br, or —I, where n is an integer from 0 to 4; R" is

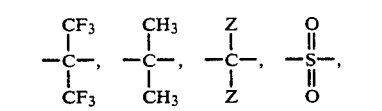

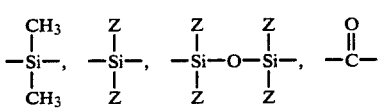

or

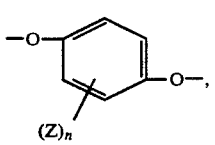

or mixtures thereof; Ar is any aromatic diamine residue; $R^a$ is any aromatic diacid moiety; $R^b$ is any aromatic triacid moiety; Q is an alkyl group having 1-10 carbon atoms or an aromatic group gaving 6-12 carbon atoms; t is a fraction from 0.01 to about 0.75; x, y and z are fractions and $x+y+z=1$ and $s+s'+t=1$.

5. The membrane of claim 4 where Q is $CH_3$.

6. The membrane of claim 4 where Ar is selected from the group consisting of

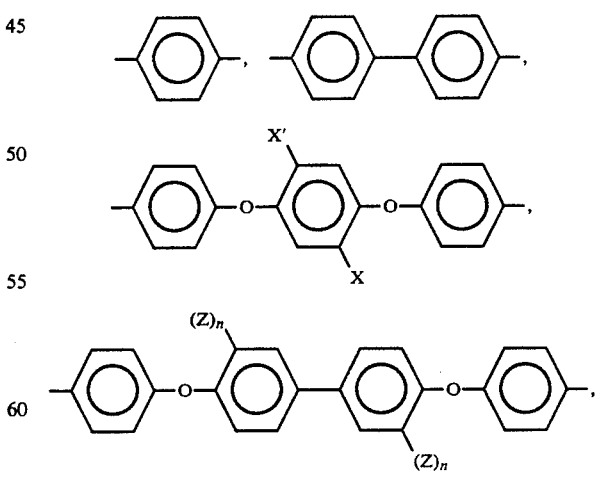

or mixtures thereof, where X is independently an alkyl group having 1 to 6 carbon atoms or a phenyl group, X' is X or —H and X" is —O—, —S—,
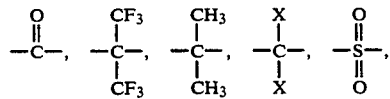
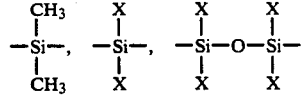
or mixtures thereof.
* * * * *